United States Patent
Haag et al.

(10) Patent No.: US 11,573,319 B2
(45) Date of Patent: Feb. 7, 2023

(54) METHOD FOR OPERATING AN ULTRASONIC SENSOR OF A VEHICLE WITH REDUCED DIAGNOSTICS IN A MEASURING MODE OF THE ULTRASONIC SENSOR, AND ULTRASONIC SENSOR DEVICE

(71) Applicant: Valeo Schalter und Sensoren GmbH, Bietigheim-Bissingen (DE)

(72) Inventors: Fabian Haag, Bietigheim-Bissingen (DE); Michael Hallek, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 17/279,348

(22) PCT Filed: Jun. 6, 2019

(86) PCT No.: PCT/EP2019/064749
§ 371 (c)(1),
(2) Date: Mar. 24, 2021

(87) PCT Pub. No.: WO2020/064153
PCT Pub. Date: Apr. 2, 2020

(65) Prior Publication Data
US 2021/0396873 A1 Dec. 23, 2021

(30) Foreign Application Priority Data
Sep. 28, 2018 (DE) .......................... 102018124024.4

(51) Int. Cl.
*G01S 15/931* (2020.01)
*B60W 50/08* (2020.01)
*G07C 5/08* (2006.01)

(52) U.S. Cl.
CPC ........... *G01S 15/931* (2013.01); *B60W 50/08* (2013.01); *G07C 5/0808* (2013.01); *B60W 2420/54* (2013.01)

(58) Field of Classification Search
CPC .... G01S 15/931; G01S 15/87; G01S 7/52006; G01S 7/52004; G01S 2007/52009; B60W 50/08; B60W 2420/54; G07C 5/0808
See application file for complete search history.

(56) References Cited

U.S. PATENT DOCUMENTS

| | | | | |
|---|---|---|---|---|
| 5,991,234 A | * | 11/1999 | Sejalon | ................. B06B 1/0246 367/13 |
| 2018/0204394 A1 | * | 7/2018 | Dahl | .................... G07C 5/0808 |

(Continued)

FOREIGN PATENT DOCUMENTS

| | | |
|---|---|---|
| DE | 10106142 A1 | 8/2002 |
| DE | 102008042820 A1 | 4/2010 |

(Continued)

OTHER PUBLICATIONS

International Search Report and Written Opinion in corresponding International Application No. PCT/EP2019/064749, dated Oct. 15, 2019 (16 pages).

(Continued)

*Primary Examiner* — Ryan W Sherwin
(74) *Attorney, Agent, or Firm* — Osha Bergman Watanabe & Burton LLP

(57) ABSTRACT

The invention relates to a method for operating an ultrasonic sensor (4) of a vehicle (1), in which a sound transducer element (11) of the ultrasonic sensor (4) is excited with a predetermined excitation signal, wherein the excitation signal has a predetermined current amplitude, an electrical test voltage (U) at the sound transducer element (11) resulting from the excitation signal is measured, and a diagnosis of the ultrasonic sensor (4) is carried out on the basis of the test (Continued)

voltage (U), wherein the ultrasonic sensor (4) is excited with the excitation signal in a measuring mode for the transmission of an ultrasonic signal, the electrical test voltage (U) is measured during the transmission, on the basis of the electrical test voltage (U) a reduced diagnosis is carried out, wherein the ultrasonic sensor (4) either continues to be operated in the measuring mode or is operated in a diagnostic mode for a complete diagnosis, depending on a result of the reduced diagnosis.

13 Claims, 4 Drawing Sheets

(56) References Cited

U.S. PATENT DOCUMENTS

| | | | | |
|---|---|---|---|---|
| 2019/0018122 | A1* | 1/2019 | Ogawa | G01S 15/08 |
| 2019/0277967 | A1* | 9/2019 | Ogawa | G01S 15/04 |
| 2020/0142044 | A1* | 5/2020 | Matsuura | G01S 15/931 |

FOREIGN PATENT DOCUMENTS

| | | | | |
|---|---|---|---|---|
| DE | 102012002979 | A1 | 8/2013 | |
| DE | 102013021328 | A1 | 6/2015 | |
| DE | 102014201482 | A1 * | 7/2015 | G01S 7/52004 |
| DE | 102014201482 | A1 | 7/2015 | |
| DE | 102014110187 | A1 | 1/2016 | |
| DE | 102014213122 | A1 | 1/2016 | |
| DE | 102014115000 | A1 * | 4/2016 | G01S 15/931 |
| DE | 102014115000 | A1 | 4/2016 | |
| DE | 102017105043 | A1 | 9/2018 | |
| DE | 102017122383 | A1 | 3/2019 | |
| DE | 102017128837 | A1 | 6/2019 | |

OTHER PUBLICATIONS

German Search Report issued in corresponding German Application No. 10 2018 124 024.4, dated May 16, 2019 (5 pages).

* cited by examiner

METHOD FOR OPERATING AN ULTRASONIC SENSOR OF A VEHICLE WITH REDUCED DIAGNOSTICS IN A MEASURING MODE OF THE ULTRASONIC SENSOR, AND ULTRASONIC SENSOR DEVICE

The present invention relates to a method for operating an ultrasonic sensor of a vehicle, in which a sound transducer element of the ultrasonic sensor is excited with a predetermined excitation signal, wherein the excitation signal has a predetermined current amplitude, an electrical test voltage at the sound transducer element resulting from the excitation signal is measured, and a diagnosis of the ultrasonic sensor is carried out on the basis of the test voltage. The present invention furthermore relates to an ultrasonic sensor device for a vehicle. The invention finally relates to a computer program product and to a computer-readable medium.

The focus here is primarily on ultrasonic sensor devices for vehicles. Ultrasonic sensor devices of this sort can, for example, be used to sense an object or an obstacle in a surrounding region of the vehicle. Such an ultrasonic sensor device usually comprises an ultrasonic sensor or ultrasonic transducer with which a distance from the object can be determined. The ultrasonic sensor usually comprises a membrane that can be excited into mechanical oscillation to transmit an ultrasonic signal with a corresponding sound transducer element. The ultrasonic signal transmission from the ultrasonic sensor is then reflected from the object and again impinges upon the membrane of the ultrasonic sensor. The distance between the ultrasonic sensor and the object can then be determined on the basis of the transit time between the emission of the ultrasonic signal and the reception of the ultrasonic signal reflected by the object, taking the propagation speed of the ultrasonic signal in air, or the speed of sound, into consideration.

An electro-acoustic energy conversion is thus carried out with the aid of the sound transducer element. Independently of the physical principle underlying this energy conversion, which can inter alia be of a mechanical-inductive, mechanical-capacitive, mechanical-resistive, magnetostrictive or electrostrictive nature, internally or externally induced changes can occur in the sound transducer element. Depending on the severity of these changes, this can lead to errors in the measurement result or to a complete failure of the ultrasonic sensor. Nowadays, such a failure of the ultrasonic sensor is commonly established through plausibility checking by a system operating the ultrasonic sensor. Changes in the ultrasonic sensor, in particular in the sound transducer element, are, on the other hand, usually not detected at all.

Methods are known from the prior art in which an ultrasonic sensor for distance measurement can be supplemented with internal electronics in order to perform a self-diagnosis through online determination of the transfer function of the sound transducer element. In this way, the failure of the ultrasonic sensor can be determined, or changes in the sound transducer element can be quantified, internally within the sensor. This procedure can either be carried out during the normal measuring mode of a distance measurement, or a dedicated diagnostic mode can be provided in which distance measurement does not take place. The first requires either a full implementation of the evaluation algorithm within the sensor electronics, entailing increased costs for the ultrasonic sensor, or, however, a transmission of the data to a higher-level system, thereby entailing occupancy of communication bandwidth and, in some cases, expensive intermediate storage of the sensor data. The latter, on the other hand, reduces the performance of the system, since the ultrasonic sensor cannot carry out distance measurement during the time of the dedicated diagnostic mode.

DE 10 2014 213 122 A1 describes for this purpose a method for sound-based surroundings detection, in which an electrical signal is injected into a sound transducer, whereby a transmission of an acoustic measurement signal via the sound transducer is effectuated. The method also comprises the ascertainment of the beginning of a reverberation dominance region on the basis of stored values assigned to the sound transducer from a data memory. A first electrical signal of the sound transducer is furthermore sensed within the reverberation dominance region, and characteristic properties, in particular a transfer function, of the sound transducer, are ascertained from the first electrical signal. The reverberation dominance region here is that period of time in the transducer signal that lies between the end of the injection of the electrical measurement signal to be transmitted and the end of the reverberation dominance region.

It is the object of the present invention to indicate a solution as to how a diagnosis of an ultrasonic sensor of the type mentioned at the beginning can be carried out more efficiently.

This object is achieved according to the invention by a method, by an ultrasonic sensor device, by a computer program product and by a computer-readable medium with the features according to the independent claims. Advantageous developments of the present invention are given in the dependent claims.

A method according to the invention is used for the operation of an ultrasonic sensor of a vehicle. In the method, a sound transducer element of the ultrasonic sensor is excited with a predetermined excitation signal. The excitation signal here has a predetermined current amplitude. In addition to this, an electrical test voltage at the sound transducer element resulting from the excitation signal is measured, and a diagnosis of the ultrasonic sensor is carried out on the basis of the test voltage. It is provided here that the ultrasonic sensor is excited with the excitation signal in a measuring mode for transmitting an ultrasonic signal. The electrical test voltage is furthermore measured during the transmission. A reduced diagnosis is carried out on the basis of the electrical test voltage, wherein, depending on a result of the reduced diagnosis, the ultrasonic sensor either continues to be operated in the measuring mode or is operated in a diagnostic mode for a complete diagnosis.

The ultrasonic sensor of the vehicle is to be operated using the method. The method can be carried out with an ultrasonic sensor device that comprises an electronic control unit. This electronic control unit can be connected to a computing apparatus of the ultrasonic sensor for data transmission. This computing apparatus can, for example, be provided by an internal sensor electronics of the ultrasonic sensor. This ultrasonic sensor can be operated in a measuring mode. In this measuring mode, objects in the region surrounding the vehicle can be recognized on the basis of the measurements of the ultrasonic sensor. The ultrasonic signal can be transmitted with the ultrasonic sensor for this purpose. The sound transducer element of the ultrasonic sensor can be excited with a suitable excitation signal for this purpose. The sound transducer element can, for example, be a piezoelectric element. As a consequence of the excitation of the sound transducer element with the excitation signal, the sound transducer element, and a membrane of the ultrasonic sensor connected to the sound transducer element, are excited into oscillation, whereby the ultrasonic signal is transmitted. In the measuring mode of the ultrasonic sensor, the ultrasonic signal reflected from an object or from an obstacle in the surrounding region can furthermore be received again. The membrane and the sound transducer element are excited into oscillation by the reflected ultrasonic signal, or the echo of the ultrasonic signal, whereby a sensor signal is output by the sound transducer element. The distance between the ultrasonic sensor and the object can then be determined on the basis of this sensor signal or of the transit time between the emission of the ultrasonic signal and the reception of the ultrasonic signal reflected by the object.

It is provided according to a significant aspect of the present invention, that a reduced diagnosis is also carried out in the measuring mode of the ultrasonic sensor. The ultrasonic signals are transmitted in the measuring mode of the ultrasonic sensor. It can also be provided that ultrasonic signals reflected in the surrounding region are additionally also received in the measuring mode. A distance measurement is thus carried out in the measuring mode of the ultrasonic sensor. Temporally sequential measuring cycles can be carried out in the measuring mode, in each of which an ultrasonic signal is transmitted. In the measuring mode, the sound transducer element of the ultrasonic sensor is excited with the excitation signal. The current amplitude of the excitation signal is known here. The excitation signal, or the current amplitude of the excitation signal, can have a constant frequency. It can also be provided that the frequency of the current amplitude of the excitation signal changes depending on the time. The test voltage present at the sound transducer element is also measured during the transmission of the ultrasonic signal. This test voltage is brought about by the excitation signal. The test voltage can also be referred to as the transmission voltage. The reduced diagnosis of the ultrasonic sensor is then carried out depending on this test voltage. The functional capability of the ultrasonic sensor can, in particular, be checked here.

It is further provided that a decision is taken depending on the result of the reduced diagnosis as to whether the ultrasonic sensor continues to be operated in the measuring mode or whether the ultrasonic sensor is switched into the diagnostic mode in which a complete diagnosis is carried out. During the reduced diagnosis, it is thus possible to decide whether the ultrasonic sensor is functionally capable or not. If the ultrasonic sensor is functionally capable, it can continue to be operated in the measuring mode. If it is recognized that the functional capability of the ultrasonic sensor may be impaired, the diagnostic mode can be carried out. Here, in the complete diagnosis, the functional capability, or possible faults, of the ultrasonic sensor can be determined accurately. This means that the complete diagnosis in the diagnostic mode, in which a distance measurement in particular is carried out, is only performed if a fault may be present in the ultrasonic sensor. This invention is based on the recognition of the fact that the state of the ultrasonic sensor, or of the sound transducer element, can be detected through the voltage curve or the test voltage during the transmission process if the excitation signal is either constant or known. The possibilities of applying a self-diagnostic function are combined in such a way that the respective disadvantages are minimized, and the advantages are maximized. This altogether enables a particularly efficient diagnosis of the ultrasonic sensor.

Reduced diagnostic parameters are preferably determined by means of a computing device of the ultrasonic sensor on the basis of the test voltage, and the reduced diagnosis is carried out on the basis of the reduced diagnostic parameters. An online diagnosis of the ultrasonic sensor can thus be carried out. When the ultrasonic sensor is in measuring mode, the reduced diagnostic parameters can thus be determined on the basis of the test voltage using the computing device of the ultrasonic sensor, i.e. internally to the sensor. The measuring mode of the ultrasonic sensor is thus not affected, or only to a small extent. In addition it is possible to ensure that objects in the surrounding region of the vehicle are recognized with the aid of the ultrasonic sensor. An ultrasonic sensor for distance measurement can thus be supplemented with an internal computing device or electronics in order to carry out a full online diagnosis in an optimum manner in respect of costs and/or benefits, or a blindness and/or precision, with a high flexibility. Instead of having to analyse the complete voltage curve, or transmit it to a higher level system, with heavy use of resources, during operation of the ultrasonic sensor or the measuring cycle of the ultrasonic sensor, only the reduced diagnostic parameters, which describe the state of the ultrasonic sensor in a restricted manner, are calculated on the basis of the test voltage.

In a further form of embodiment, a difference between the reduced diagnostic parameters and the predetermined reference diagnostic parameters is determined, wherein the ultrasonic sensor is operated in the diagnostic mode if the difference exceeds a predetermined threshold value. The reduced diagnostic parameters are compared with the reference diagnostic parameters that have been ascertained in, for example, the diagnostic mode or during the complete diagnosis. If the difference between these two sets of parameters exceeds the predetermined threshold value, or a limit, then the state of the sound transducer element has changed beyond the set limit. A new, comprehensive diagnosis, or the complete diagnosis, can thus be necessary, and can subsequently be carried out. In this way it can be ensured on the one hand that the state of the sound transducer element is monitored in each measurement cycle, which is essential for safety-critical applications. On the other hand, the number of full diagnoses is however reduced to a minimum, and the average measuring rate of the ultrasonic sensor can thus be kept at a high level.

In a further embodiment, a gradient of the test voltage, an integral of the test voltage and/or a weighted sum of the gradients and the integral of the test voltage is determined in order to determine the reduced diagnostic parameters. The excitation signal with which the sound transducer element is excited can have a frequency that changes depending on the time. In particular, the current amplitude of the excitation signal can have a time-dependent frequency. The greater the variance of the excitation signal, in particular in terms of the frequency, the more information can be obtained about the state of the sound transducer element. The profile of the test voltage over time can be taken into account in order to determine the reduced diagnostic parameters. The gradient and/or the integral of the profile of the test voltage over time can furthermore be determined. The gradient and/or the integral can then be weighted with a predetermined weighting factor and then added together in order to determine the reduced diagnostic parameters. The gradient, the integral and/or their weighted sum are in particular suitable for determining the reduced diagnostic parameters, since these values are robust in respect of interference.

It is furthermore advantageous if a result signal that describes the result of the reduced diagnosis is transmitted from the computing device of the ultrasonic sensor to a control unit of the vehicle. According to one form of embodiment, the result signal describes whether the difference between the reduced diagnostic parameters and the predetermined reference diagnostic parameters exceeds the threshold value. In the simplest case, the result signal can have an information content of one bit. The two states, in which the difference exceeds the threshold value or in which the difference is less than the threshold value can thus be described. It can also be provided that a flag, either having the value 0 or the value 1, is set in order to provide the result signal. A deduction with a small data transmission rate between the sensor-internal computing device and the electronic control unit is thus adequate. Costs and computing capacity can be saved in this way.

According to a further form of embodiment, the result signal describes a state of the ultrasonic sensor that is determined on the basis of the reduced diagnostic parameters, and/or the result signal describes previously determined states of the ultrasonic sensor. The degree of the reduced diagnosis can be chosen in an application-specific manner, in that the specification of the calculation and the dimension of the reduced diagnostic parameters are changed. The type of the change, or of the state of the ultrasonic sensor can thus, for example, already be estimated in the reduced diagnosis. It is, for example, possible to deduce whether the temperature has changed, or whether soiling is present at the ultrasonic sensor or at its membrane. Alternatively or in addition a history of this change can be determined. Additional information is thus made available to the higher-level system or to the electronic control unit, whereby the scope for decision-making can be increased.

According to a further form of embodiment, the reference diagnostic parameters are determined in the diagnostic mode of the ultrasonic sensor on the basis of full diagnostic parameters. These full diagnostic parameters can describe the state of the ultrasonic sensor, of the sound transducer element and/or of the external influences for the current period of time. The full diagnostic parameters can, for example, describe whether the ultrasonic sensor or the sound transducer element is functionally capable. The full diagnostic parameters can, furthermore, describe an ageing of the sound transducer element. The full diagnostic parameters can also describe whether there is dirt, ice, snow or the like on the membrane. The full diagnostic parameters can also describe external influences that act on the ultrasonic sensor, such as, for example, the temperature. Reference diagnostic parameters can then be determined or adapted on the basis of the full diagnostic parameters. Altogether this enables a reliable conclusion as to the manner of function of the ultrasonic sensor, or of the sound transducer element, during the reduced diagnosis.

The full diagnostic parameters can describe an electrical model or an equivalent circuit diagram of the ultrasonic sensor. It is advantageous here if the electrical model of the ultrasonic sensor is formed of a first capacitance, a second capacitance separate from the first capacitance, a first inductance, a second inductance separate from the first inductance, a first ohmic resistance and a second ohmic resistance separate from the first ohmic resistance, wherein the first capacitance, the first inductance and the first ohmic resistance are connected in series, and the second capacitance, the second inductance and the second ohmic resistance are each connected in parallel with the series circuit. The second capacitance, the second inductance and the second ohmic resistance in particular represent the electrical, in particular parasitic, properties of the components of the ultrasonic sensor. These properties are taken into account in the electrical model. For example, a mechanical flexibility, which corresponds to the reciprocal value of the stiffness, of the membrane of the ultrasonic sensor can be described by means of the first capacitance. A movable mass of the membrane can in particular be described by means of the first inductance. A damping of the ultrasonic signal can in particular be described by means of the first ohmic resistance. The functional state of the ultrasonic sensor can in particular be determined by means of the physical capacitance, the mechanical flexibility of the movable mass, and the damping.

According to a further form of embodiment, the full diagnostic parameters and/or the reduced diagnostic parameters are determined depending on an operating mode of the ultrasonic sensor when in measuring mode. The ultrasonic sensor can be operated in different operating modes when in measuring mode, for example for distance measurement. One operating mode can, for example, be a close-range mode in which objects that are nearby can be recognized. An operating mode can furthermore be a normal operating mode, a long-range operating mode or the like. The operating modes can differ in terms of the excitation signal. The operating modes can in particular differ from one another in terms of a time duration of the excitation signal, a frequency, a voltage, a current amplitude or the like. If the reduced diagnostic parameters and/or the full diagnostic parameters are now determined depending on the current operating mode of the ultrasonic sensor, this altogether enables a more reliable diagnosis.

It is furthermore advantageous if the sound transducer element is excited in the diagnostic mode with a predetermined diagnostic signal, and an electrical diagnostic voltage in consequence of the diagnostic signal is determined. It is in particular provided here that a current amplitude of the diagnostic signal is frequency modulated. The frequency of the current amplitude of the diagnostic signal preferably has a linear positive slope followed by a linear negative slope. In other words, the diagnostic signal comprises a linear up-chirp and a subsequent linear down-chirp. The comprehensive diagnosis, or the complete diagnosis, is based on an excitation of the sound transducer element with a current-controlled, frequency-modulated diagnostic signal of short duration. The time duration of the diagnostic signal can, for example, extend for several milliseconds. The diagnostic voltage is, in addition, measured at the sound transducer element. The full diagnostic parameters are then determined from the profile of this diagnostic voltage. This can, for example, take place by means of a lookup table or by means of the parameterization of models. Due to the short excitation duration, it is generally necessary in the latter case to carry out a compensation for transient effects in order to enable a generalization.

In one form of embodiment, reverberation parameters that are determined during a reverberation of a membrane of the ultrasonic sensor are additionally taken into account for the reduced diagnosis and/or for the complete diagnosis. The ultrasonic sensor is excited with the excitation signal for transmission of the ultrasonic signal. After the excitation of the ultrasonic sensor or of the sound transducer element with the excitation signal, the membrane of the ultrasonic sensor reverberates for a predetermined reverberation duration. Reverberation parameters can be determined during this reverberation or during the reverberation duration. The reverberation parameters can, for example, describe the reverberation frequency, the reverberation duration and/or the shape of the reverberation amplitude. It is possible, for example, to recognize in a reliable manner on the basis of these reverberation parameters whether soiling, snow, ice or the like are to be found on the membrane of the ultrasonic sensor.

An ultrasonic device according to the invention comprises an electronic control unit and at least one ultrasonic sensor that comprises an electronic computing device. The ultrasonic sensor device is designed to carry out a method according to the invention and the advantageous embodiments thereof. It can also be provided that the ultrasonic sensor device comprises a plurality of ultrasonic sensors. These can then be arranged distributed at the vehicle. If it is recognized on the basis of the reduced diagnosis and/or of the complete diagnosis, that a functional capability of the ultrasonic sensor is impaired, a suitable warning signal can be output with the ultrasonic sensor device. Depending on the warning signal, the user of the vehicle can be appropriately warned or have their attention drawn to the fact that the ultrasonic sensor is not capable of function.

A driver assistance system according to the invention comprises an ultrasonic sensor device according to the invention. The driver assistance system can, for example, be designed as a parking assistance system, and can serve to support the driver when parking into a parking space and/or when exiting a parking space. There can also be provision that the driver assistance system is designed as a braking assistant.

A vehicle according to the invention comprises an ultrasonic sensor device according to the invention or a driver assistance system according to the invention. The vehicle can in particular be embodied as a passenger car. There can also be provision that the vehicle is embodied as a utility vehicle.

The invention also includes a computer program with program code means that are stored in a computer-readable medium in order to carry out the method according to the invention and the advantageous embodiments thereof when the computer program product is run on a processor of an electronic computing unit and/or an electronic control unit.

A further aspect of the invention relates to a computer-readable medium, in particular in the form of a computer-readable disk, CD, DVD, memory card, USB memory unit or the like, in which program code means are stored, in order to carry out the method according to the invention and the advantageous embodiments thereof when the program code means are loaded into a memory of an electronic computing device and/or of an electronic control unit and are run on a processor of the electronic computing device and/or of the electronic control unit.

The preferred embodiments presented with respect to the method according to the invention, and the advantages thereof, correspondingly apply to the ultrasonic sensor device according to the invention, to the driver assistance system according to the invention, to the vehicle according to the invention, to the computer program product according to the invention and to the computer-readable medium according to the invention.

Further features of the invention emerge from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as included and as disclosed. Embodiments and combinations of features that therefore do not have all the features of an independent claim as originally worded are also intended to be regarded as disclosed. Furthermore, embodiments and combinations of features that go beyond or differ from the combinations of features set out in the back-references of the claims should be considered to be disclosed, in particular by the embodiments set out above.

The invention will now be explained in more detail on the basis of preferred exemplary embodiments and with reference to the attached drawings. Here:

Identical or functionally identical elements are provided with the same reference signs in the figures.

Figure 1:
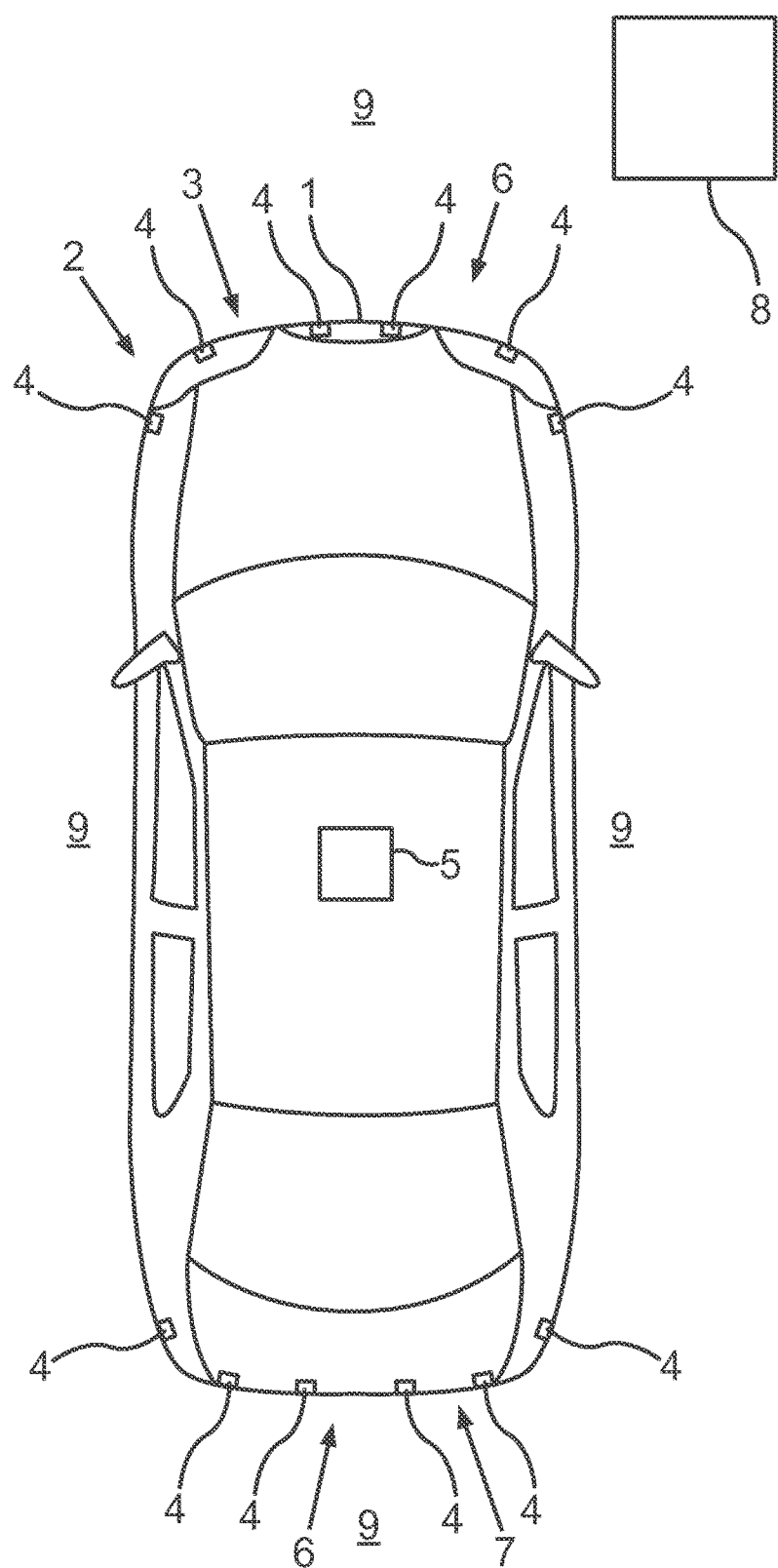
FIG. 1 shows a schematic illustration of a vehicle that comprises an ultrasonic sensor device with a plurality of ultrasonic sensors.

FIG. 1 shows a plan view of a vehicle 1 which, in the present case, is designed as a passenger motor vehicle. The vehicle 1 comprises a driver assistance system 2 whose purpose is to assist a driver when driving the vehicle 1. The driver assistance system 2 can, for example, be designed as a parking assistance system by means of which a driver can be assisted when parking the vehicle 1 into a parking space and/or when exiting the parking space.

The driver assistance system 2 comprises an ultrasonic sensor device 3. This ultrasonic sensor device 3 comprises at least one ultrasonic sensor 4. In the present exemplary embodiment, the ultrasonic sensor device 3 comprises twelve ultrasonic sensors 4, of which six are arranged in a front region 6 of the vehicle 1 and six in a rear region 7 of the vehicle 1. The ultrasonic sensors 4 can, in particular, be mounted on the bumpers of the vehicle 1. In this context, the ultrasonic sensors 4 can be arranged at least in certain areas in corresponding recesses or through-openings in the bumpers. It can also be provided that the ultrasonic sensors 4 are arranged hidden behind the bumpers. In principle, the ultrasonic sensors 4 can also be arranged in other cladding parts or components of the vehicle 1. The ultrasonic sensors 4 can, for example, also be arranged at or hidden behind the doors of the vehicle 1.

Objects 8 in a surrounding region 9 of the vehicle 1 can be sensed with the respective ultrasonic sensors 4. An object 8 is here shown schematically in the surrounding area 9. The ultrasonic sensor device 3 moreover comprises an electronic control unit 5 that is connected for data transmission to the respective ultrasonic sensors 4. The respective ultrasonic sensors 4 can be excited to transmit an ultrasonic signal with the electronic control unit 5. In addition, sensor data that are provided by the ultrasonic sensors 4, can be transmitted to the control unit 5. On the basis of the sensor data, the objects 8 in the surrounding region 9 can be recognized with the control unit 5. This information can then be used by the driver assistance system 2 to give an output to the driver of the vehicle 1. It can furthermore be provided that the driver assistance system 2 manipulates a steering system, a braking system and/or a drive motor of the vehicle 1 in order to manoeuvre the vehicle 1 at least semi-autonomously, depending on the sensed object 8.

Figure 2:
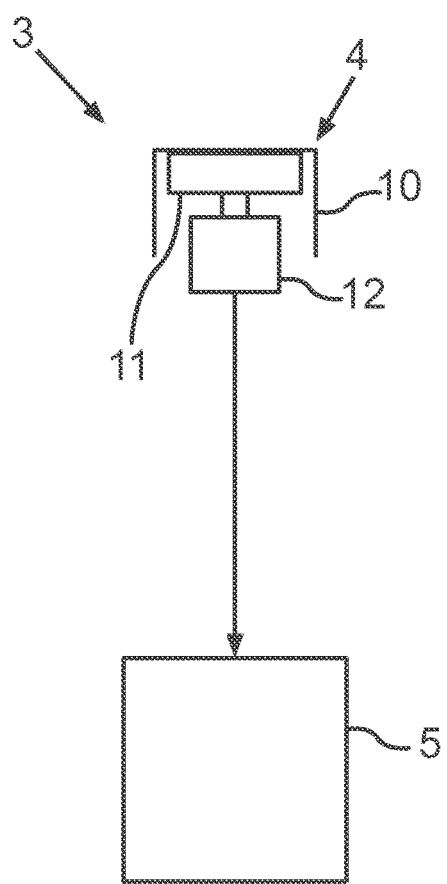
FIG. 2 shows a schematic illustration of an ultrasonic sensor device that comprises an ultrasonic sensor with an internal computing device as well as an electronic control unit.

FIG. 2 shows a schematic illustration of an ultrasonic sensor device 3 that comprises the electronic control unit 5. In the present simplified illustration, the ultrasonic sensor device 3 comprises an ultrasonic sensor 4. The ultrasonic sensor 4 comprises a membrane 10 that can, for example, be manufactured from a metal, and can be designed in the form of a pot. In addition, the ultrasonic sensor 4 comprises a sound transducer element 11 that is connected for the transmission of oscillations to the membrane 10. The ultrasonic sensor 4 moreover comprises an internal electronic computing device 12 that is connected for data transmission to the electronic control unit 5.

The ultrasonic sensor 4 can be operated in a measuring mode. In the measuring mode, the objects 8 in the surrounding region 9 are sensed. In the measuring mode, an ultrasonic signal is transmitted with the ultrasonic sensor 4. An excitation signal is applied for this purpose to the sound transducer element 11, while a time profile of the current amplitude of the excitation signal is known or predetermined. A test voltage U present at the sound transducer element 11 is determined during the transmission of the ultrasonic signal. A reduced diagnosis can then be carried out on the basis of this test voltage U. It is then possible on the basis of the reduced diagnosis to decide whether the ultrasonic sensor 4 is to continue operating in the measuring mode, or whether the ultrasonic sensor 4 is to be operated in a diagnostic mode in which a complete diagnosis is carried out.

If the diagnostic mode, or the complete diagnosis, is requested by the control unit 5, the sound transducer element 11 can be excited with a diagnostic signal by means of the computing device 12 of the ultrasonic sensor 4. This diagnostic signal can be a frequency-modulated current signal. The current amplitude of the diagnostic signal can in particular have a linear positive slope followed by a linear negative slope. A diagnostic voltage resulting from the diagnostic signal can also be measured at the sound transducer element 11. This diagnostic voltage can be appropriately compressed, and transmitted to the control unit 5. This compressed diagnostic voltage can be received and appropriately decompressed by the control unit 5. Transient effects can furthermore be compensated for. Following this, full diagnostic parameters that, for example, describe an electrical equivalent circuit diagram of the sound transducer element 11 can be determined. Reference diagnostic parameters can then be ascertained on the basis of the full diagnostic parameters. These reference diagnostic parameters can in particular be ascertained for different operating modes of the ultrasonic sensor 4.

Figure 3:
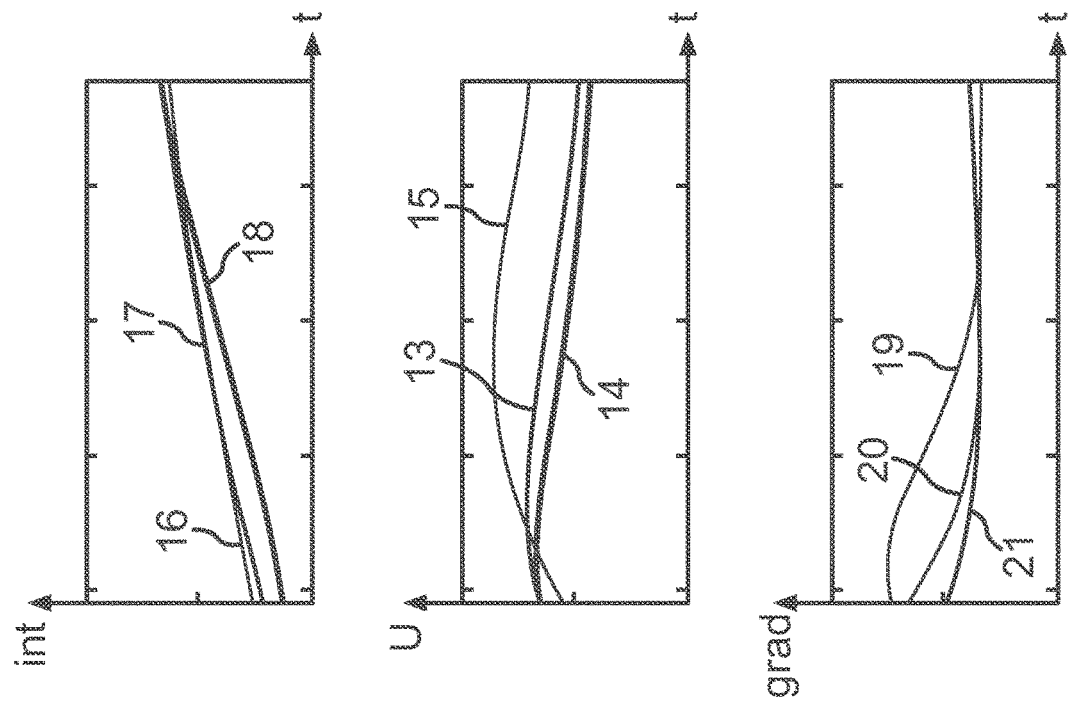
FIG. 3 shows graphs that describe a test voltage of the ultrasonic sensor, a gradient of the test voltage, and an integral of the test voltage.
Figure 4:
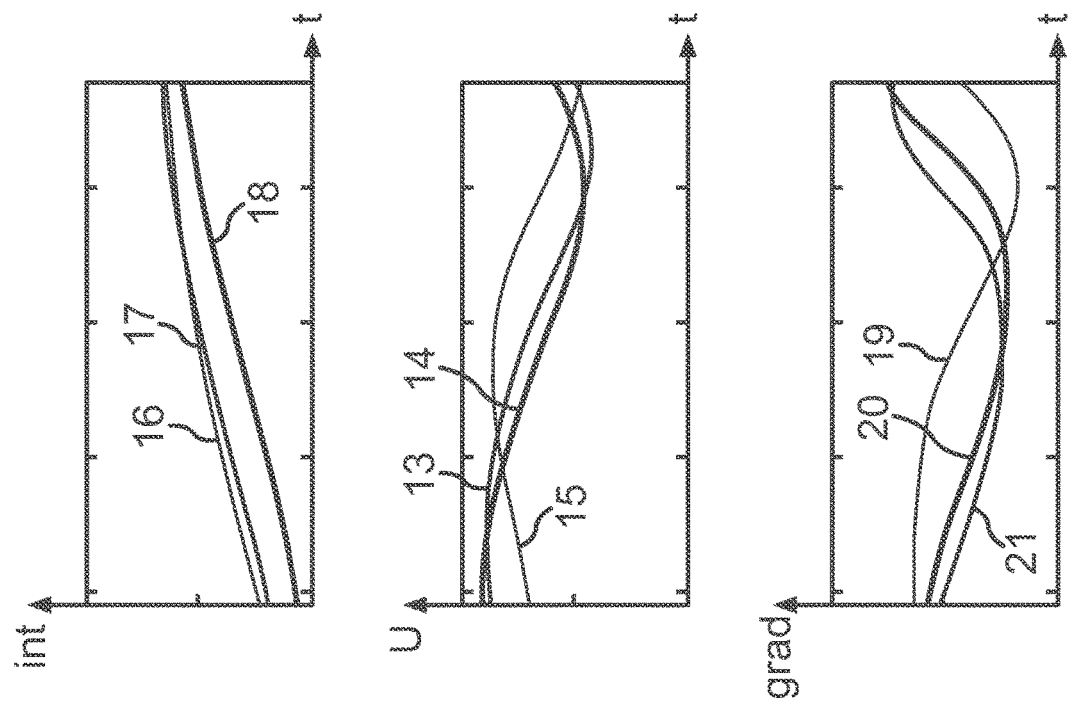
FIG. 4 shows graphs that describe the test voltage, the gradient of the test voltage, and an integral of the test voltage for a further operating mode of the ultrasonic sensor.

In the measuring mode, the ultrasonic sensor 4 can be operated in the different operating modes. These operating modes can, for example, describe a close-range mode, a normal operating mode, a long-range mode or the like. The reduced diagnostic parameters Pr can here be ascertained by the computing device 12 on the basis of the test voltage U. A gradient of the test voltage grad, and/or an integral of the test voltage int, can first be determined for this purpose. This is illustrated in connection with FIG. 3. In the central region here, the test voltage U is displayed against time t. The curves 13, 14 and 15 here describe different states of the sound transducer element 11. The curves 13, 14 and 15 can, for example, describe different temperatures of the sound transducer element 11. In the upper part of FIG. 3, the integral of the test voltage int is displayed against time t. The curves 16, 17 and 18 here describe the integral of the test voltage int for the different states. In the lower part of FIG. 3, the gradient of the test voltage grad is displayed against time t. The curves 19, 20 and 21 here describe the gradient of the test voltage grad for the different states. Analogously to FIG. 3, FIG. 4 shows the temporal curve of the test voltage U, the temporal curve of the integral of the test voltage int, and the temporal curve of the gradient of the test voltage grad for a different operating mode of the ultrasonic sensor 4.

Figure 5:
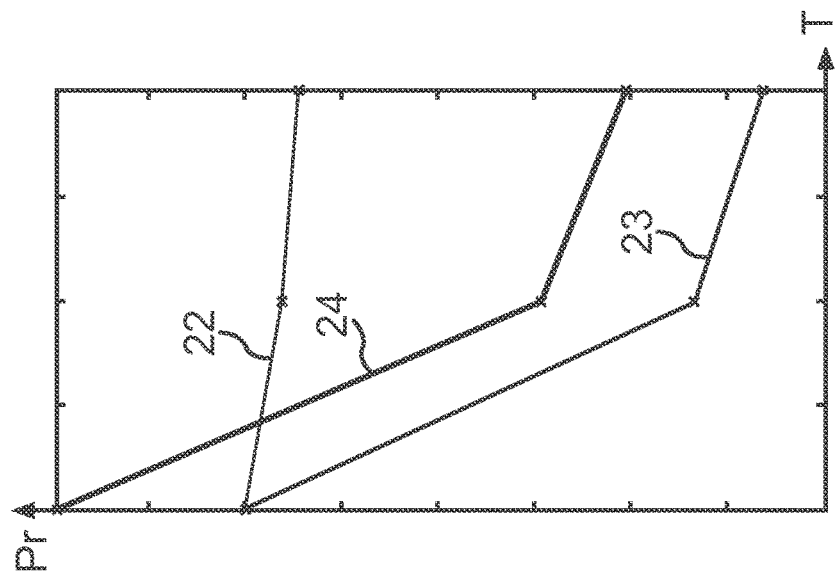
FIG. 5 shows various reduced diagnostic parameters depending on a state of a sound transducer element of the ultrasonic sensor.
Figure 6:
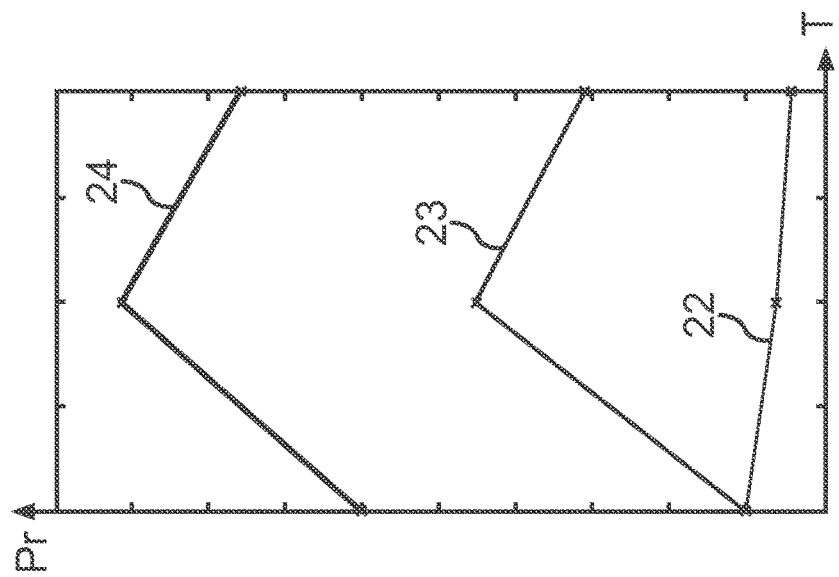
FIG. 6 shows various reduced diagnostic parameters of the sound transducer element depending on the state for a further operating mode of the ultrasonic sensor.

In order to determine the reduced diagnostic parameters Pr, the integral of the test voltage int and the gradient of the test voltage grad can be added in weighted form. FIG. 5 shows in this connection the curve of different reduced diagnostic parameters Pr in relation to the state of the sound transducer element 11. In this case, the state relates to the temperature T of the sound transducer element 11. The curves 22, 23 and 24 here describe reduced diagnostic parameters Pr, which have been determined or calculated in different ways. It can be seen here that curves 23 and 24 in particular are not very suitable for describing the state or the temperature T, as they are not continuous or not unambiguous. In comparison with this, FIG. 6 shows curves 22, 23 and 24 that describe the reduced diagnostic parameters Pr that have been determined in a different way, for another operating mode of the ultrasonic sensor 4. It can be seen here that the state of the sound transducer element 11 can be ascertained on the basis of these reduced diagnostic parameters Pr. Curves 23 and 24, for example, are particularly suitable for this purpose.

It is then possible to check whether the reduced diagnostic parameters Pr are different from the reference diagnostic parameters. If the difference between the reduced diagnostic parameters Pr and the reference diagnostic parameters exceeds a predetermined threshold value, a corresponding flag can be set, or a result signal can be output. In this case, the ultrasonic sensor 4 is then operated in diagnostic mode.

Taken altogether, a method for the complete online diagnosis of the ultrasonic sensor 4 through the optimum combination of a computing-efficient and resources-efficient yet permanent, change-focused method with a comprehensive but needs-driven procedure can thus be enabled. Change-monitoring can be carried out through the reduced diagnosis during the measuring mode. A sensor-internal calculation, specific to the operating mode, of reduced diagnostic parameters is carried out here in each transmission cycle on the basis of the gradients of the test voltage grad and the integral of the test voltage int. An observation of the difference between these parameters and the reference diagnostic parameters furthermore takes place. The comprehensive self-diagnosis, or the complete diagnosis in the dedicated diagnostic mode, is carried out if the difference exceeds the threshold value. In the comprehensive diagnosis, or during the diagnostic mode, the sound transducer element 11 is subjected to the diagnostic signal. The measurement of the diagnostic voltage, and the compensation for the transient effects, also take place. In addition, the current state of the sound transducer element 11, or of the ultrasonic sensor 4, is determined, and the reaction of the ultrasonic sensor 4 to the diagnosed state is determined. An update of the reduced diagnostic parameters on the basis of the full diagnostic parameters, finally takes place.

At least the following points can be varied here: the division of the processes in the control unit 5 and the computing device 12, the calculation specification for the full diagnostic parameters, and the calculation specification for the reduced diagnostic parameters. The phase relationship between the exciting current or the excitation signal and the measured test voltage can also be taken into consideration in the complete and/or reduced diagnosis. The dimension of the reduced diagnostic parameters Pr, the dimension of the full diagnostic parameters and/or the type of excitation in the diagnostic mode can also be varied.

The invention claimed is:

1. A method for operating an ultrasonic sensor of a vehicle, the method comprising:
   exciting a sound transducer element of the ultrasonic sensor with a predetermined excitation signal, wherein the excitation signal has a predetermined current amplitude;
   measuring an electrical test voltage at the sound transducer element resulting from the excitation signal; and
   carrying out a diagnosis of the ultrasonic sensor on the basis of the test voltage,
   wherein
      the ultrasonic sensor is excited with the excitation signal in a measuring mode for the transmission of an ultrasonic signal, the electrical test voltage is measured during the transmission, and on the basis of the electrical test voltage a reduced diagnosis is carried out,
      the ultrasonic sensor either continues to be operated in the measuring mode or is operated in a diagnostic mode for a complete diagnosis, depending on a result of the reduced diagnosis,
      reduced diagnostic parameters are determined on the basis of the test voltage by a computing device of the ultrasonic sensor,
      the reduced diagnosis is carried out on the basis of the reduced diagnostic parameters,
      a difference between the reduced diagnostic parameters and predetermined reference diagnostic parameters is determined, and
      the ultrasonic sensor is operated in the diagnostic mode when the difference exceeds a predetermined threshold value.

2. The method according to claim 1, wherein a gradient of the test voltage, an integral of the test voltage and/or a weighted sum of the gradients of the test voltage and the integral of the test voltage is determined in order to determine the reduced diagnostic parameters.

3. The method according to claim 1, wherein a result signal that describes the result of the reduced diagnosis is transmitted from the computing device of the ultrasonic sensor to a control unit of the vehicle.

4. The method according to claim 3, wherein result signal describes whether the difference between the reduced diagnostic parameters and the predetermined reference diagnostic parameters exceeds the threshold value.

5. The method according to claim 3, wherein the result signal describes a state of the ultrasonic sensor that is determined on the basis of the reduced diagnostic parameters, and/or previously determined states of the ultrasonic sensor.

6. The method according to claim 1, wherein the reference diagnostic parameters are determined in the diagnostic mode of the ultrasonic sensor on the basis of full diagnostic parameters.

7. The method according to claim 6, wherein the full diagnostic parameters and/or the reduced diagnostic parameters are determined depending on an operating mode of the ultrasonic sensor when in measuring mode.

8. The method according to claim 1, wherein the sound transducer element is excited in the diagnostic mode with a predetermined diagnostic signal, and an electrical diagnostic voltage in consequence of the diagnostic signal is determined.

9. The method according to claim 8, wherein a current amplitude of the predetermined diagnostic signal is frequency-modulated, wherein a frequency of the current amplitude of the predetermined diagnostic signal has, in particular, a linear positive slope followed by a linear negative slope.

10. The method according to claim 1, wherein reverberation parameters that are determined during a reverberation of a membrane of the ultrasonic sensor are additionally taken into account for the reduced diagnosis and/or for the complete diagnosis.

11. An ultrasonic sensor device comprising: an electronic control unit; and at least one ultrasonic sensor that comprises an electronic computing device, wherein the ultrasonic sensor device is configured to carry out a method according to claim 1.

12. A computer program product with program code means that are stored in a non-transitory computer-readable medium, in order to perform a method according to claim 1 when the computer program product is run on a processor of an electronic computing device of an ultrasonic sensor and/or of an electronic control unit.

13. A computer-readable medium in the form of a computer-readable disk, CD, DVD, memory card, or a USB memory unit, in which program code means are stored, in order to carry out a method as claimed in claim 1, when the program code means are loaded into a memory of an electronic computing device of an ultrasonic sensor and/or of an electronic control unit and are run on a processor of the electronic computing device and/or of the electronic control unit.

* * * * *